US009650002B2

(12) United States Patent  
Sasaki

(10) Patent No.: US 9,650,002 B2  
(45) Date of Patent: May 16, 2017

(54) TANK FIXING APPARATUS

(71) Applicant: TOYOTA JIDOSHA KABUSHIKI KAISHA, Toyota-shi, Aichi-ken (JP)

(72) Inventor: Shigeru Sasaki, Nagoya (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/872,630

(22) Filed: Oct. 1, 2015

(65) Prior Publication Data

US 2016/0096495 A1  Apr. 7, 2016

(30) Foreign Application Priority Data

Oct. 1, 2014 (JP) ................................. 2014-203482

(51) Int. Cl.
*F17C 13/08* (2006.01)
*B60K 15/03* (2006.01)
(Continued)

(52) U.S. Cl.
CPC ............ *B60R 16/08* (2013.01); *B60K 15/067* (2013.01); *F16B 2/08* (2013.01); *F16M 13/02* (2013.01)

(58) Field of Classification Search
CPC ......... B60R 16/08; B60K 15/067; F16B 2/08; F16M 13/02; F17C 13/084; F17C 2205/0107; F17C 2205/0126
(Continued)

(56) References Cited

U.S. PATENT DOCUMENTS 4,555,083 A * 11/1985 Carter ....................... B60P 7/12  
224/403  
5,284,267 A *  2/1994 Polletta ..................... F17C 7/00  
220/4.14  
(Continued)

FOREIGN PATENT DOCUMENTS

JP       2006-240463 A      9/2006  
JP       2010175001 A  *   8/2010  
(Continued)

OTHER PUBLICATIONS

Office Action issued to U.S. Appl. No. 14/869,005 on Jul. 14, 2016.  
(Continued)

*Primary Examiner* — Anita M King  
(74) *Attorney, Agent, or Firm* — Andrews Kurth Kenyon LLP

(57) ABSTRACT

A tank fixing apparatus includes: a first band including a first fixed portion fixed to a support member supporting a tank, a first pressing portion extending from the first fixed portion and pressing the tank toward the support member, and a first distal end portion extending from the first pressing portion and not fixed to the support member; an urging portion giving a pressing force for the first band; a first fixing portion fixing the first fixed portion to the support member; a second band including a second fixed portion fixed to the support member or the first band, a second pressing portion extending from the second fixed portion and pressing the tank, and a second distal end portion extending from the second pressing portion and not fixed to the support member; and a second fixing portion fixing the second fixed portion to the support member or the first band.

4 Claims, 4 Drawing Sheets

(51) Int. Cl.
*F16B 2/24* (2006.01)
*B60R 16/08* (2006.01)
*B60K 15/067* (2006.01)
*F16B 2/08* (2006.01)
*F16M 13/02* (2006.01)

(58) Field of Classification Search
USPC .... 248/505, 571, 500, 227.3, 230.1, 231.21, 248/231.85; 280/834, 830
See application file for complete search history.

(56) References Cited

U.S. PATENT DOCUMENTS

| | | | |
|---|---|---|---|
| 6,042,071 A * | 3/2000 | Watanabe | B60K 15/07 180/69.5 |
| 6,287,062 B1 | 9/2001 | Vallance | |
| 7,264,277 B2 | 9/2007 | Ono et al. | |
| 7,562,788 B2 | 7/2009 | Watanabe et al. | |
| 8,366,152 B2 * | 2/2013 | Tsubokawa | B60K 15/07 280/784 |
| 8,408,600 B2 | 4/2013 | Kondo et al. | |
| 8,579,331 B2 | 11/2013 | Hayashi et al. | |
| 8,944,469 B2 * | 2/2015 | Mulanon | F17C 13/084 280/834 |
| 2010/0045018 A1 * | 2/2010 | Kondo | B60K 15/07 280/834 |
| 2012/0056412 A1 | 3/2012 | Kawamoto et al. | |
| 2015/0096977 A1 | 4/2015 | Sirosh et al. | |
| 2016/0096495 A1 | 4/2016 | Sasaki | |
| 2016/0097487 A1 | 4/2016 | Sasaki | |

FOREIGN PATENT DOCUMENTS

| | | |
|---|---|---|
| JP | 2012-051529 A | 3/2012 |
| JP | 2012-081807 A | 4/2012 |

OTHER PUBLICATIONS

Office Action issued to U.S. Appl. No. 14/869,005 on Oct. 7, 2016.
Office Action issued in U.S. Appl. No. 14/869,005 on Feb. 7, 2017.

* cited by examiner

TANK FIXING APPARATUS

INCORPORATION BY REFERENCE

The disclosure of Japanese Patent Application No. 2014-203482 filed on Oct. 1, 2014 including the specification, drawings and abstract is incorporated herein by reference in its entirety.

BACKGROUND OF THE INVENTION

1. Field of the Invention

The invention relates to a tank fixing apparatus.

2. Description of Related Art

For example, Japanese Patent Application Publication No. 2012-081807 discloses a technique for fixing a tank to a vehicle skeleton member by a plurality of bands. To be more specific, one end of each of the bands is fixed to the vehicle skeleton member, and the other end is urged toward the vehicle skeleton member by a coil spring, so that the tank is fixed to the vehicle skeleton member by the band.

The tank fixed to the vehicle skeleton member as described above is preferably prevented from rattling against the vehicle skeleton member when, for example, vibration or impact is applied to the vehicle skeleton member. It is thus preferable to urge the tank toward the vehicle skeleton member by the band by using an elastic body having a large urging force. However, the elastic body having a large urging force has a large size. Thus, a size of an entire apparatus may be increased by employing the elastic body having a large urging force as described above.

SUMMARY OF THE INVENTION

The invention provides a tank fixing apparatus in which an increase in size is suppressed.

A first aspect of the invention is a tank fixing apparatus including: a first band including a first fixed portion that is fixed to a support member that supports a tank, a first pressing portion that extends from the first fixed portion and presses an outer periphery of the tank toward the support member, and a first distal end portion that extends from the first pressing portion and is not fixed to the support member; an urging portion that gives a pressing force for the tank to the first band; a first fixing portion that fixes the first fixed portion of the first band to the support member; a second band including a second fixed portion that is fixed to the support member or the first band, a second pressing portion that extends from the second fixed portion and presses the tank, and a second distal end portion that extends from the second pressing portion and is not fixed to the support member; and a second fixing portion that fixes the second fixed portion to the support member or the first band, wherein the second pressing portion of the second band extends between one portion of the first pressing portion and the tank, and presses the tank by an elastic force of the second pressing portion itself, and a direction of the first band extending from the first fixed portion to the first distal end portion is opposite to a direction of the second band extending from the second fixed portion to the second distal end portion.

When a force for separating the tank from the support member is applied to the tank, the distal end portion of each of the bands attempts to swing about a position on the fixed portion side, and the tank attempts to rotate in a direction from the fixed portion to the distal end portion along an inner surface of the pressing portion of each of the bands. However, a direction of the first band extending from the first fixed portion to the first distal end portion is opposite to a direction of the second band extending from the second fixed portion to the second distal end portion. Therefore, directions in which the first and second bands attempt to swing are opposite to each other. As a result, a rotational direction of the tank due to the swing of the first band and a rotational direction of the tank due to the swing of the second band are opposite to each other. Thus, even when the force for separating the tank from the support member is applied to the tank, the rotation of the tank T is suppressed. In order that the tank may separate from the support member in a state in which the rotation of the tank is suppressed as described above, a force exceeding static friction forces generated between the tank and the pressing portion of the first band and between the tank and the pressing portion of the second band needs to be applied to the tank to cause the tank to slide on the first and second bands. The static friction forces are generated between the tank, the rotation of which is suppressed, and the first and second bands as described above, so that rattling of the tank against the support member is suppressed. Therefore, the rattling of the tank can be suppressed without increasing an urging force of the urging portion that urges the first band.

Also, the second pressing portion of the second band extends between one portion of the first pressing portion and the tank, and presses the tank by the elastic force of the second pressing portion itself Thus, the elastic force of the second band and the pressing force of the first band given by the urging portion are both applied to the tank. Therefore, the rattling of the tank can be suppressed without increasing the urging force of the urging portion that urges the first band. Consequently, an increase in size of the urging portion is suppressed, and an increase in size of the tank fixing apparatus can be also suppressed.

The first pressing portion may include a direct pressing portion that is located on the first fixed portion side and presses the tank without the second pressing portion interposed therebetween, and an indirect pressing portion that is located on the first distal end portion side and presses the tank with the second pressing portion interposed therebetween.

The urging portion may include an elastic body that gives a pressing force to the first band by urging the first distal end portion, and a support shaft that holds the elastic body and is fixed to the support member while passing through the first distal end portion so as to enable the first distal end portion to slide on the support shaft, the second fixing portion may be the support shaft, and the second fixed portion may be fixed to the support member by the support shaft.

The first and second fixed portions, and the first and second pressing portions may be wound around the outer periphery of the tank, and the second fixed portion may be fixed to the first band.

According to the aspect of the invention, the tank fixing apparatus in which the increase in size is suppressed can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, modes for carrying out the invention will be described based on embodiments.

Figure 1:
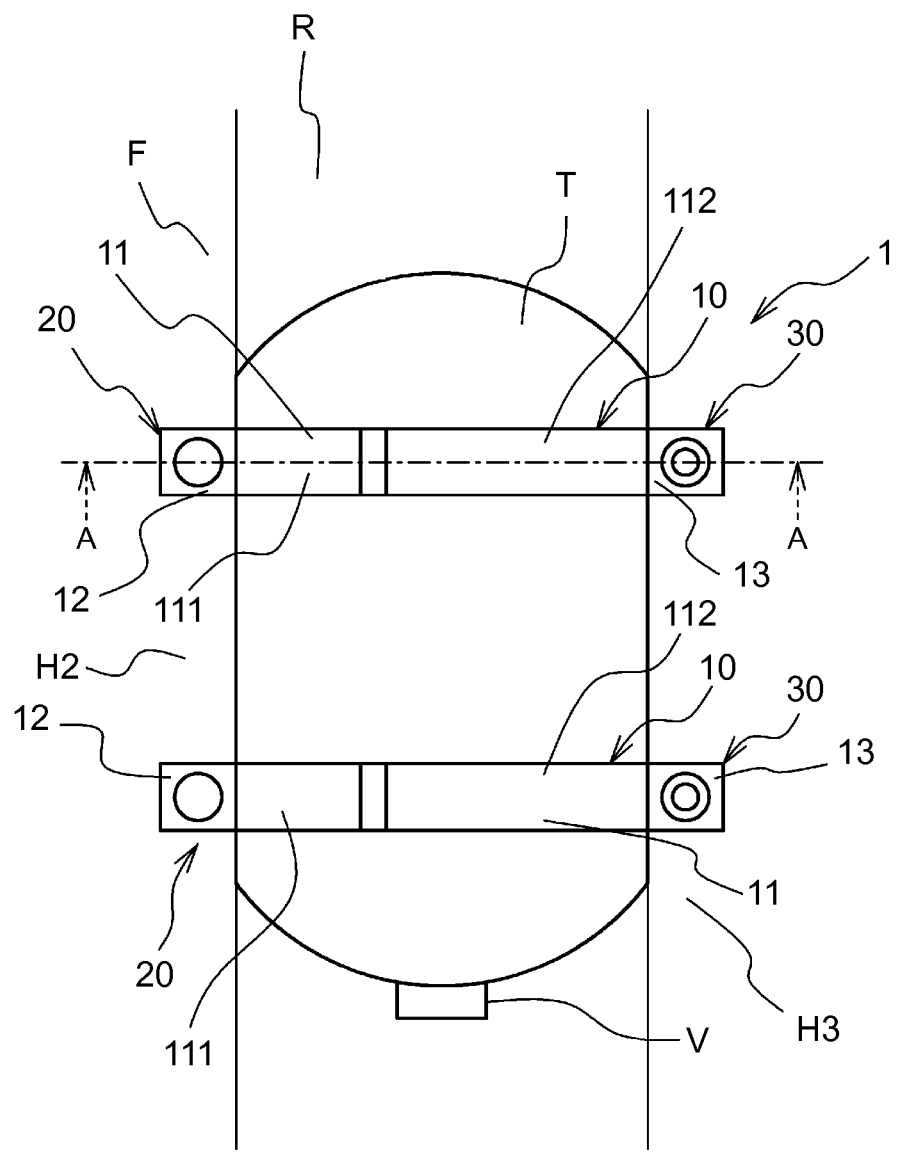
FIG. 1 is a top view of a fixing apparatus of a first embodiment mounted in a vehicle.
Figure 2:
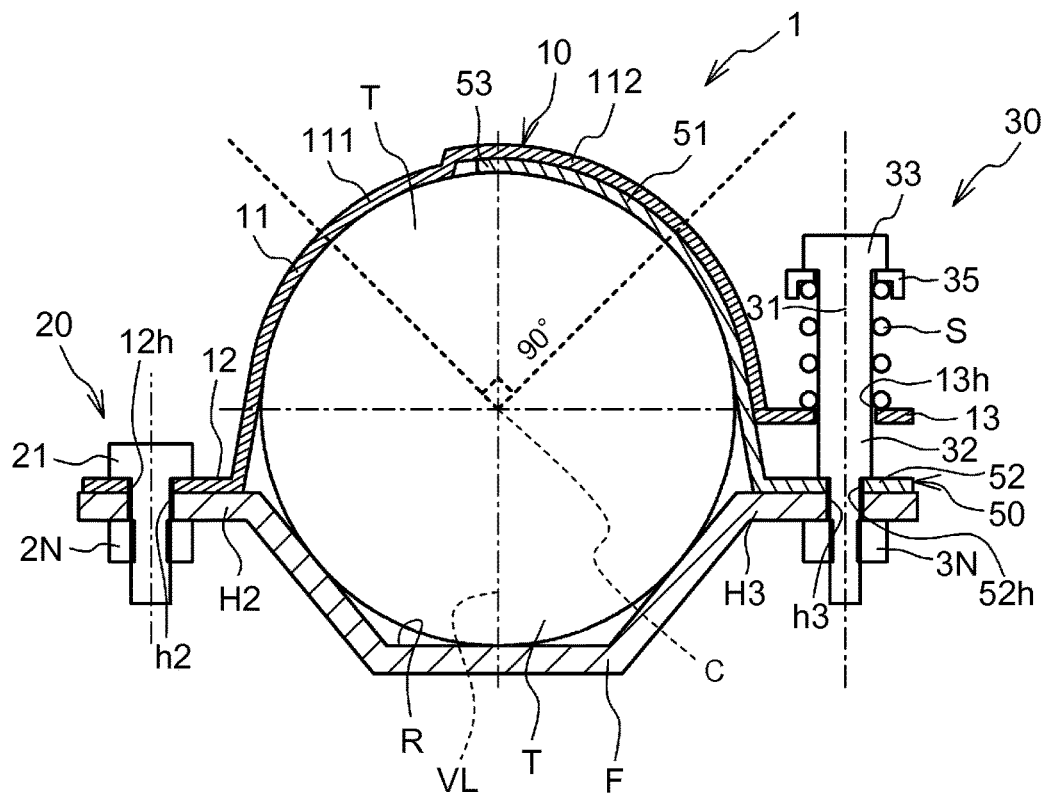
FIG. 2 is a cross-sectional view along A-A in FIG. 1.

FIG. 1 is a top view of a fixing apparatus 1 of a first embodiment. FIG. 2 is a cross-sectional view along A-A in FIG. 1. The fixing apparatus 1 includes two sets of bands 10, 50, a fixing mechanism 20, and an urging mechanism 30. The two sets of the members are arranged side by side in a longitudinal direction of a tank T, and have the same structure and the same function. The tank T is accommodated in a recessed portion R that is formed in an upper surface of a platform F of a vehicle (not shown) so as to accommodate the tank. The tank T is fixed by the bands 10, 50. The tank T is fixed to the platform F such that the longitudinal direction is aligned with a horizontal direction. The platform F is an example of a support member that supports the tank T. The tank T stores a hydrogen gas at high pressure. The hydrogen gas stored in the tank T is supplied to a fuel cell (not shown) mounted in the vehicle. The tank T is made of resin and has a cylindrical shape. A valve base V made of metal is provided on one end side of the tank T, and a pipe (not shown) that supplies the hydrogen gas to the fuel cell is connected to the valve base V.

The band 10 presses an upper half of a periphery of the tank T. The band 50 extends between the band 10 and the tank T. The band 50 presses about a quarter of the periphery on an upper side of the tank T, and is thus shorter than the band 10. The bands 10, 50 are both made of metal, and are examples of first and second bands. Although a rubber sheet (not shown) is interposed between the bands 10, 50 and the tank T, the rubber sheet may not be provided. The band 10 includes a proximal end portion 12 that is fixed to the platform F, a curved portion 11 that extends from the proximal end portion 12 so as to be curved along an outer periphery of the tank T, and a distal end portion 13 that extends from the curved portion 11 in a direction away from the tank T. The platform F includes the recessed portion R, and flat portions H2, H3 that extend in the horizontal direction with the recessed portion R therebetween. The proximal end portion 12 of the band 10 is fixed to the flat portion H2 of the platform F by the fixing mechanism 20. The urging mechanism 30 is fixed to the flat portion H3 of the platform F, and urges the distal end portion 13 of the band 10 toward the platform F. That is, the fixing mechanism 20 and the urging mechanism 30 are located opposite to each other across the tank T.

The band 50 includes a proximal end portion 52 that is fixed to the platform F, a curved portion 51 that extends from the proximal end portion 52 so as to be curved along the outer periphery of the tank T, and a distal end portion 53 that extends from the curved portion 51. As will be described in detail later, the proximal end portion 52 is fixed to the flat portion H3 of the platform F by a bolt 31 of the urging mechanism 30. The proximal end portion 52 is an example of a second fixed portion that is fixed to the support member. The curved portion 51 presses about a quarter portion of the outer periphery of the tank T, and is shorter than the curved portion 11 of the band 10. The distal end portion 53 is located close to an upper portion in a vertical direction of the tank T. The curved portion 51 and the distal end portion 53 are located between one portion of the curved portion 11 of the band 10 and the tank T. The band 50 is fixed to the platform F in a state in which the band 50 is elastically deformed by the tank T so as to press the tank T by itself. Therefore, a pressing force of the band 10 and a pressing force obtained from an elastic force of the band 50 itself are applied to the tank T. That is, the curved portion 51 is an example of a second pressing portion that extends from the second fixed portion and presses the tank. The distal end portion 53 is an example of a second distal end portion that extends from the second pressing portion and is not fixed to the support member. The proximal end portion 12 of the band 10 and the proximal end portion 52 of the band 50 are located opposite to each other across the tank T. Although the bands 10, 50 have the same width, the bands 10, 50 may also have different widths.

As shown in FIG. 2, the fixing mechanism 20 includes a bolt 21 and a nut 2N. The bolt 21 of the fixing mechanism 20 passes through a through-hole 12$h$ formed in the proximal end portion 12 of the band 10, is screwed to a threaded hole h2 formed in the flat portion H2, and is fixed by the nut 2N. Accordingly, the band 10 is partially fixed to the platform F by the fixing mechanism 20. The fixing mechanism 20 is an example of a first fixing portion that fixes a first fixed portion of the first band to the support member. Note that the proximal end portion 12 of the band 10 is an example of the first fixed portion that is fixed to the support member that supports the tank. Means for partially fixing the band 10 to the platform F is not limited to the bolt 21 and the nut 2N, and the band 10 may be fixed by welding or other methods.

As shown in FIG. 2, the urging mechanism 30 includes the bolt 31, a receiving member 35, an elastic body S, and a nut 3N. The bolt 31 passes through a through-hole 13$h$ formed in the distal end portion 13 of the band 10, is screwed to a threaded hole h3 formed in the flat portion H3, and is fixed by sandwiching the flat portion H3 of the platform F and the proximal end portion 52 of the band 50 between a step portion 32 of the bolt 31 and the nut 3N. A diameter of a through-hole 52$h$ formed in the proximal end portion 52 of the band 50 is smaller than a diameter of the step portion 32 of the bolt 31, and is larger than a diameter of a small portion of the bolt 31 below the step portion 32. Therefore, the portion of the bolt 31 below the step portion 32 passes through the through-hole 52$h$, and the proximal end portion 52 of the band 50 is fixed to the platform F by the step portion 32 and the nut 3N. Consequently, the number of components is reduced, and an increase in size and weight of the fixing apparatus 1 is suppressed as compared to a case in which a component that fixes the band 50 to the platform F is provided separately from the urging mechanism 30.

The receiving member 35 is located between a head portion 33 of the bolt 31 and the distal end portion 13. The bolt 31 passes through the receiving member 35. Since an outer diameter of the head portion 33 is larger than an inner diameter of the receiving member 35, the receiving member 35 is prevented from falling off the bolt 31. A diameter of the through-hole 13$h$ of the distal end portion 13 of the band 10 is set to be large enough to allow the distal end portion 13 to slide in an axial direction of the bolt 31. While the elastic body S is specifically a coiled spring, the elastic body S is not limited to such a shape. The elastic body S is disposed between the receiving member 35 and the distal end portion 13 of the band 10 with the bolt 31 passing therethrough. The elastic body S thereby urges the distal end portion 13 of the band 10 toward the platform F. The bolt 31 is an example of a support shaft that holds the elastic body and is fixed to the support member while passing through a first distal end portion so as to enable the first distal end portion to slide on the support shaft. The band 10 presses the tank T, and the tank T is fixed to the platform F. As described above, the elastic body S of the urging mechanism 30 urges the distal end portion 13 of the band 10 located at a different position from the proximal end portion 12 of the band 10 fixed to the platform F by the fixing mechanism 20. The urging mechanism 30 is an example of an urging portion that gives a pressing force for the tank to the first band. Note that the distal end portion 13 of the band 10 is only urged by the urging mechanism 30, and is not fixed to the platform F. That is, the distal end portion 13 is an example of the first distal end portion that extends from a first pressing portion and is not fixed to the support member.

A reason why the distal end portion 13 of the band 10 is urged by the urging mechanism 30 as described above is to fix the tank T to the platform F while absorbing a variation in outer dimensions arising from molding accuracy or expansion and contraction of the tank T. If the proximal end portion 12 and the distal end portion 13 of the band 10 are fixed to the platform F, it may not be possible to absorb the variation in outer dimensions of the tank T, and stably fix the tank T to the platform F. A reason why the distal end portion 53 of the band 50 is not fixed to any member is the same.

By urging the band 10 as described above, the urging mechanism 30 gives a pressing force for pressing the tank T toward the platform F to the curved portion 11 of the band 10. The curved portion 11 is an example of the first pressing portion that extends from the first fixed portion and presses the outer periphery of the tank toward the support member.

The curved portion 11 of the band 10 has a contact portion 111 and a clearance portion 112 sequentially from the proximal end portion 12 to the distal end portion 13. The contact portion 111 presses the tank T without the band 50 interposed therebetween. The clearance portion 112 is curved along the outer periphery of the tank T with a predetermined clearance from the tank T, and presses the tank T with the curved portion 51 of the band 50 interposed therebetween. Therefore, a portion of the tank T pressed by the curved portion 51 receives a pressing force from the band 50 and a pressing force from the clearance portion 112 of the band 10. The curved portion 51 and the clearance portion 112 are thus in close contact with each other. The contact portion 111 of the curved portion 11 is an example of a direct pressing portion that is located on the first fixed portion side and presses the tank without the second pressing portion interposed therebetween. The clearance portion 112 is an example of an indirect pressing portion that is located on the first distal end portion side and presses the tank with the second pressing portion interposed therebetween.

As shown in FIG. 2, a direction of the band 10 extending from the proximal end portion 12 to the distal end portion 13 is opposite to a direction of the band 50 extending from the proximal end portion 52 to the distal end portion 53. Thus, an increase in size of the entire fixing apparatus 1 can be suppressed. This point will be described hereinafter in comparison with a fixing apparatus 1x of a comparative example different from the fixing apparatus 1 of the present embodiment.

Figure 3:
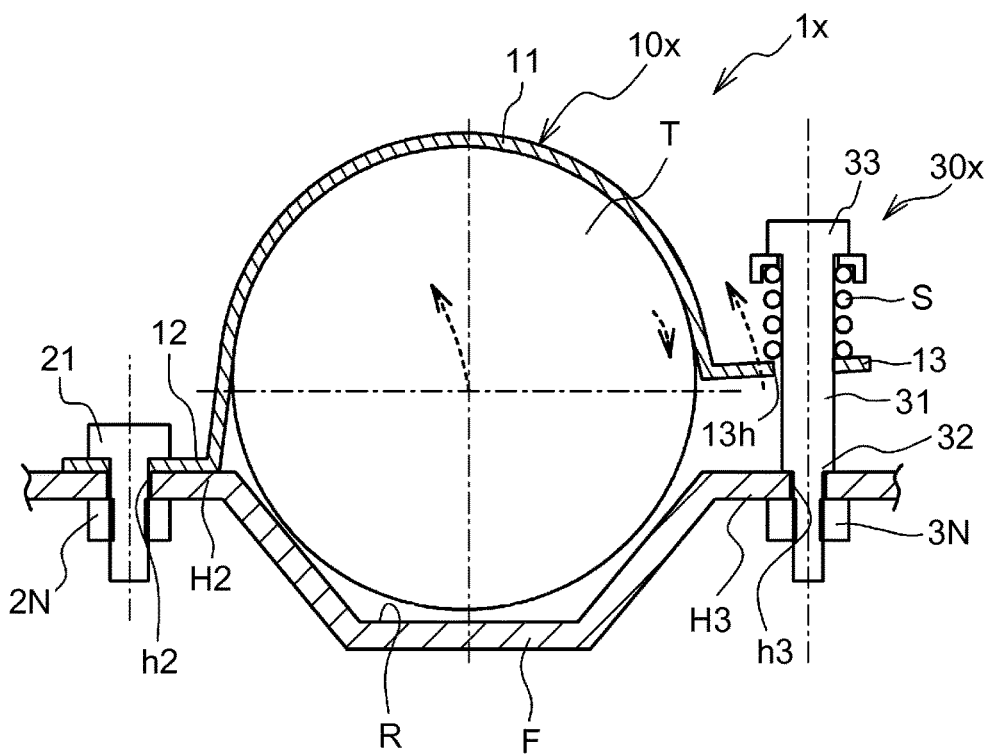
FIG. 3 is an explanatory view of rattling of a tank in a fixing apparatus of a comparative example.

FIG. 3 is an explanatory view of rattling of the tank T in the fixing apparatus 1x of the comparative example. FIG. 3 is a cross-sectional view corresponding to FIG. 2. The fixing apparatus 1x fixes the tank T to the platform F by a band 10x. In the fixing apparatus 1x, a member corresponding to the band 50 is not provided.

In the fixing apparatus 1x, if a force for raising the tank T from the platform F acts on the tank T with vibration, impact or the like applied to the platform F, the band 10x is elastically deformed so as to swing about a base portion of the curved portion 11 on the proximal end portion 12-side, and the distal end portion 13 attempts to be elastically deformed so as to move away from the platform F against an urging force of the elastic body S. This is because the proximal end portion 12 is fixed to the platform F, and the distal end portion 13 is only urged by the elastic body S without being fixed. At this time, a force for rotating the tank T in a direction from the proximal end portion 12 to the distal end portion 13 on an inner surface of the curved portion 11 is also applied to the tank T. Thus, the tank T attempts to rise while rotating on the inner surface of the curved portion 11 of the band 10x. In order to suppress rattling by inhibiting the tank T from rising, the elastic body S needs to have a large urging force. However, an elastic body having a large urging force has a large size. Sizes of peripheral members that hold the elastic body are correspondingly increased, so that a size and a weight of an urging mechanism 30x may be increased. Accordingly, a size and a weight of the entire fixing apparatus 1x may be increased, and it may become difficult to ensure a mounting space for the fixing apparatus 1x in the vehicle.

In the fixing apparatus 1 of the present embodiment, the band 50 is provided in addition to the band 10, and the direction of the band 10 extending from the proximal end portion 12 to the distal end portion 13 is opposite to the direction of the band 50 extending from the proximal end portion 52 to the distal end portion 53. Therefore, when the force for raising the tank T is applied, the band 10 attempts to swing about the proximal end portion 12-side, while the band 50 attempts to swing about the proximal end portion 52-side located opposite to the proximal end portion 12 of the band 10 across the tank T. That is, the bands 10, 50 attempt to swing in directions opposite to each other. As a result, a rotational direction of the tank T that attempts to rotate along an inner surface of the curved portion 11 of the band 10 due to the swing of the band 10 and a rotational direction of the tank T that attempts to rotate along an inner surface of the curved portion 51 of the band 50 due to the swing of the band 50 are opposite to each other. Thus, even when the raising force is applied to the tank T, the rotation of the tank T is suppressed. In order that the tank T may rise in a state in which the rotation of the tank T is suppressed as described above, a force exceeding two static friction forces generated between the tank T and the curved portion 11 of the band 10 and between the tank T and the curved portion 51 of the band 50 needs to be applied to the tank T to cause the tank T to slide on the curved portions 11, 51. The static friction forces are generated between the tank T, the rotation of which is suppressed, and the bands 10, 50 as described above.

Therefore, as compared with the fixing apparatus 1x in which the static friction forces as described above are not generated, the tank T is inhibited from rising and rattling is suppressed in the fixing apparatus 1 of the present embodiment. It is not necessary for the elastic body S of the urging mechanism 30 to have a large urging force as compared with the case of the fixing apparatus 1x. Thus, the elastic body S does not need to have a large size, so that an increase in size and weight of the urging mechanism 30 is suppressed, and the rattling of the tank T is suppressed. Accordingly, it is possible to fix the tank T in a stable state while suppressing an increase in size and weight of the fixing apparatus 1.

As described above, the elastic force of the band 50 and the pressing force of the band 10 given by the elastic body S are applied to the tank T. Therefore, the rattling of the tank T can be suppressed without increasing the urging force of the elastic body S that urges the band 10.

Also, the clearance portion 112 of the band 10 and the curved portion 51 of the band 50 are in close contact with each other. Thus, a friction force is also applied between the clearance portion 112 and the curved portion 51. Therefore, it becomes difficult for the clearance portion 112 and the curved portion 51 to slide on each other, and the rattling of the tank T can be suppressed without increasing the urging force of the elastic body S.

As shown in FIG. 2, it is also preferable that a boundary position between the contact portion 111 and the clearance portion 112 of the band 10 and a position of the distal end portion 53 of the band 50 are within an angular range of 90 degrees about a center C of the tank T with a vertical line VL perpendicular to a bottom surface of the recessed portion R and passing through the center C of the tank T as a centerline. In this case, a difference between a length of the contact portion 111 of the band 10 in contact with the tank T and a length of a portion of the band 50 in contact with the tank T is small. Thus, even when the raising force is applied to the tank T, the rotation of the tank T can be suppressed. For example, if the length of the contact portion 111 in contact with the tank T is too long and the length of the portion of the band 50 in contact with the tank T is too short, a problem as described below possibly occurs. When the raising force is applied to the tank T in this case, a force for rotating the tank T to the distal end portion 13 on the inner surface of the contact portion 111 becomes larger than a force for rotating the tank T to the distal end portion 53 on the inner surface of the curved portion 51 of the band 50. Thus, it may not be possible to suppress the rotation of the tank T. In this case, a length of a portion where the bands 10, 50 are in contact with each other is also shortened, so that the friction force between the bands 10, 50 may be also reduced. The same applies to a case in which the length of the contact portion 111 in contact with the tank T is too short and the length of the portion of the band 50 in contact with the tank T is too long.

In the fixing apparatus 1 of the first embodiment, the urging mechanisms 30 arranged on a front side and a rear side of the longitudinal direction of the tank T, respectively, are arranged on the same side with respect to the tank T as shown in FIG. 1. Therefore, for example, when there is a sufficient space on one side of the tank T and there is not a sufficient space on the other side due to space constraints in the vehicle, the fixing apparatus 1 can be mounted in the vehicle by arranging the urging mechanisms 30 on the side with a space.

Figure 4:
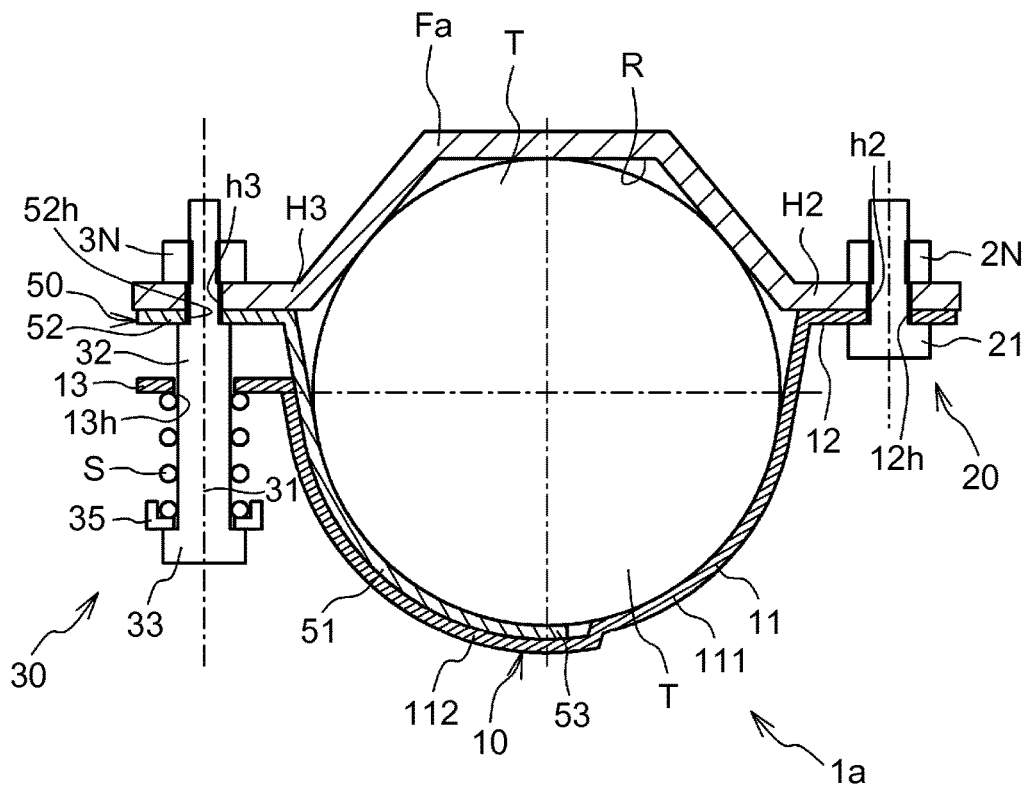
FIG. 4 is a cross-sectional view of a fixing apparatus of a second embodiment.

FIG. 4 is a cross-sectional view of a fixing apparatus 1a of a second embodiment. Note that the same components as those of the first embodiment are assigned the same reference numerals, and an overlapping description is omitted. FIG. 4 corresponds to FIG. 2. The fixing apparatus 1a includes two sets of the bands 10, 50, the fixing mechanism 20, and the urging mechanism 30. The bands 10, 50 press a lower side of the tank T to fix the tank T to the recessed portion R provided in a lower surface of a platform Fa. The platform Fa supports the tank T between the platform Fa and the bands 10, 50. In the case of the fixing apparatus 1a, a weight of the tank T is always partly applied to the elastic body S of the urging mechanism 30. Similarly, the weight of the tank T is always partly applied to the band 50. In the fixing apparatus 1a, the direction of the band 10 extending from the proximal end portion 12 to the distal end portion 13 is opposite to the direction of the band 50 extending from the proximal end portion 52 to the distal end portion 53. The elastic force of the band 50 and the pressing force of the band 10 given by the elastic body S are applied to the tank T. The clearance portion 112 of the curved portion 11 of the band 10 and the curved portion 51 of the band 50 are in close contact with each other. Accordingly, the rattling of the tank T is suppressed, and an increase in size and weight of the fixing apparatus 1a is suppressed.

Figure 5:
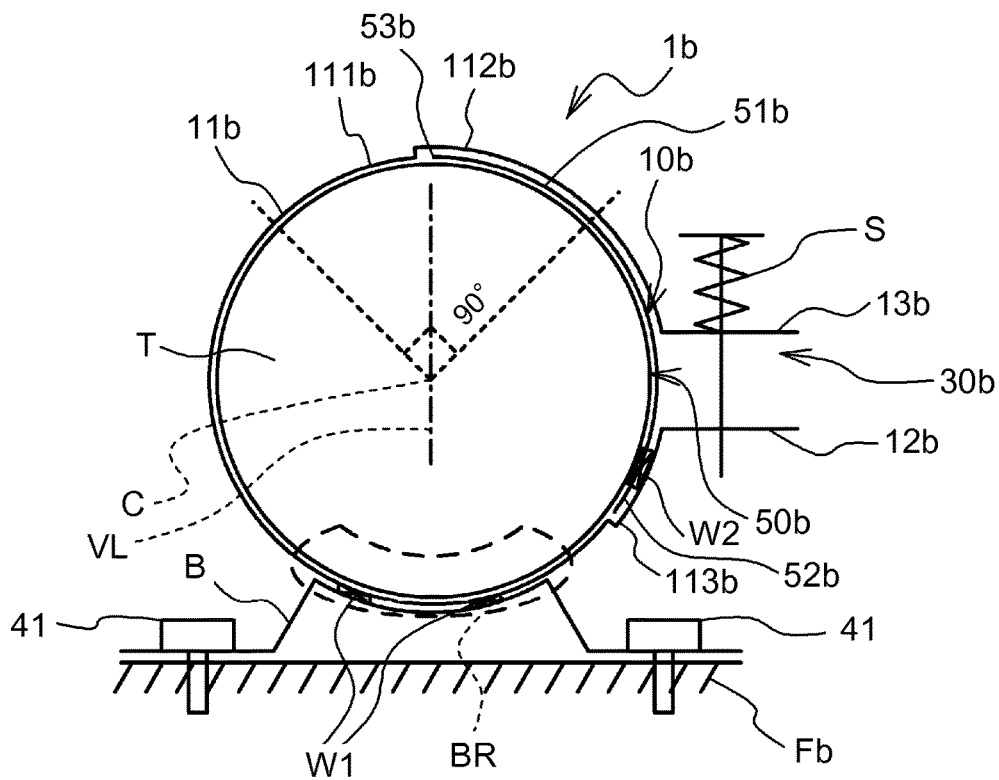
FIG. 5 is a schematic cross-sectional view of a fixing apparatus of a third embodiment.

FIG. 5 is a schematic cross-sectional view of a fixing apparatus 1b of a third embodiment. FIG. 5 corresponds to FIG. 2. The fixing apparatus 1b includes two sets of the bands 10b, 50b, and an urging mechanism 30b. A bracket B is fixed onto a platform Fb by bolts 41. The tank T is supported on an arc-shaped portion of the bracket B via the band 10b, and the bracket B is supported on the platform Fb. The platform Fb and the bracket B are examples of the support member that supports the tank T. The band 10b is wound around substantially the entire outer periphery of the tank T. The band 50b extends over about the quarter of the outer periphery of the tank T. The bands 10b, 50b are made of metal.

The band 10b includes a curved portion 11b that is curved along the outer periphery of the tank T, and a proximal end portion 12b and a distal end portion 13b that extend in a linear shape. The curved portion 11b has a facing region BR that is wound around the tank T facing the bracket B. The curved portion 11b is welded to the bracket B at two welding portions W1 in the facing region BR. The band 10b is partially fixed to the bracket B as described above. Note that means for fixing the band 10b and the bracket B is not limited to the welding, and the band 10b and the bracket B may be fixed by using a bolt and a nut. The facing region BR is an example of the first fixed portion. The welding portion W1 is an example of the first fixing portion. Here, a length from the facing region BR to the distal end portion 13b is longer than a length from the facing region BR to the proximal end portion 12b. Therefore, it is easier for the band 10b to be elastically deformed in a portion from the facing region BR to the distal end portion 13b than in a portion from the facing region BR to the proximal end portion 12b.

The proximal end portion 12b and the distal end portion 13b extend so as to separate from the tank T facing each other. The distal end portion 13b is urged toward the proximal end portion 12b by the urging mechanism 30b. Accordingly, the band 10b is tightened to press the tank T. Therefore, the curved portion 11b presses the tank T. Here, a region of the curved portion 11b opposite to the bracket B across the tank T, that is, a region of the curved portion 11b on the distal end portion 13b-side presses the tank T toward the bracket B. Therefore, the curved portion 11b is an example of the first pressing portion.

The band 50b includes a curved portion 51b, a proximal end portion 52b, and a distal end portion 53b. The entire band 50b is curved along one portion of the outer periphery of the tank T. The proximal end portion 52b is partially fixed to the band 10b by a welding portion W2. The welding portion W2 is located in a portion from the facing region BR of the band 10b to the proximal end portion 12b. The welding portion W2 is an example of a second fixing portion that fixes the second fixed portion to the first band. Note that means for fixing the band 10b and the band 50b is not limited to the welding, and the band 10b and the band 50b may be fixed by using a bolt and a nut. The curved portion 51b is located opposite to the bracket B across the tank T, and extends between the tank T and the distal end portion 13b of the band 10b and between the tank T and the curved portion 11b of the band 10b to press the tank T toward the bracket B. Therefore, the curved portion 51b is an example of the second pressing portion. A contact portion 111b of the curved portion 11b of the band 10b presses the tank T without the band 50b interposed therebetween. A clearance portion 112b is curved along the outer periphery of the tank T with a predetermined clearance from the tank T, and presses the tank T with the curved portion 51b of the band 50b interposed therebetween. A clearance portion 113b that is curved along the outer periphery of the tank T with a predetermined clearance from the tank T is also formed between the facing region BR and the proximal end portion 12b of the band 10b. The band 50b is fixed to an inner surface side of the clearance portion 113b by the welding portion W2.

Here, a direction of the band 10b extending from the facing region BR to the distal end portion 13b is opposite to a direction of the band 50b extending from the proximal end portion 52b to the distal end portion 53b. Also, the distal end portion 13b of the band 10b is urged, but is not fixed as shown in FIG. 5. Therefore, when a force for raising the tank T from the bracket B is applied to the tank T, the band 10b attempts to swing about an end of the facing region BR on the distal end portion 13b-side in a direction in which the distal end portion 13b separates from the proximal end portion 12b. The band 50b attempts to swing about the proximal end portion 52b fixed to the band 10b by the welding portion W2 in a direction in which the distal end portion 53b separates from the bracket B.

Therefore, the bands 10b, 50b attempt to swing in directions opposite to each other. Accordingly, the rotation of the tank T is suppressed, and the tank T is inhibited from rising according to a principle similar to that described in the first embodiment. Thus, the elastic body S does not need to have a large size, so that an increase in size and weight of the urging mechanism 30b is suppressed, and the rattling of the tank T is suppressed. Accordingly, an increase in size and weight of the fixing apparatus 1b is suppressed.

As shown in FIG. 5, it is also preferable that a boundary position between the contact portion 111b and the clearance portion 112b of the band 10b and a position of the distal end portion 53b of the band 50b are within an angular range of 90 degrees about the center C of the tank T with the vertical line VL perpendicular to a surface of the platform Fb and passing through the center C of the tank T as a centerline. In this case, a difference between a length of a portion where the contact portion 111b of the band 10b presses the tank T toward the bracket B and a length of a portion where the band 50 presses the tank T toward the bracket B is small. Thus, even when the raising force is applied to the tank T, the rotation of the tank T can be suppressed.

Figure 6:
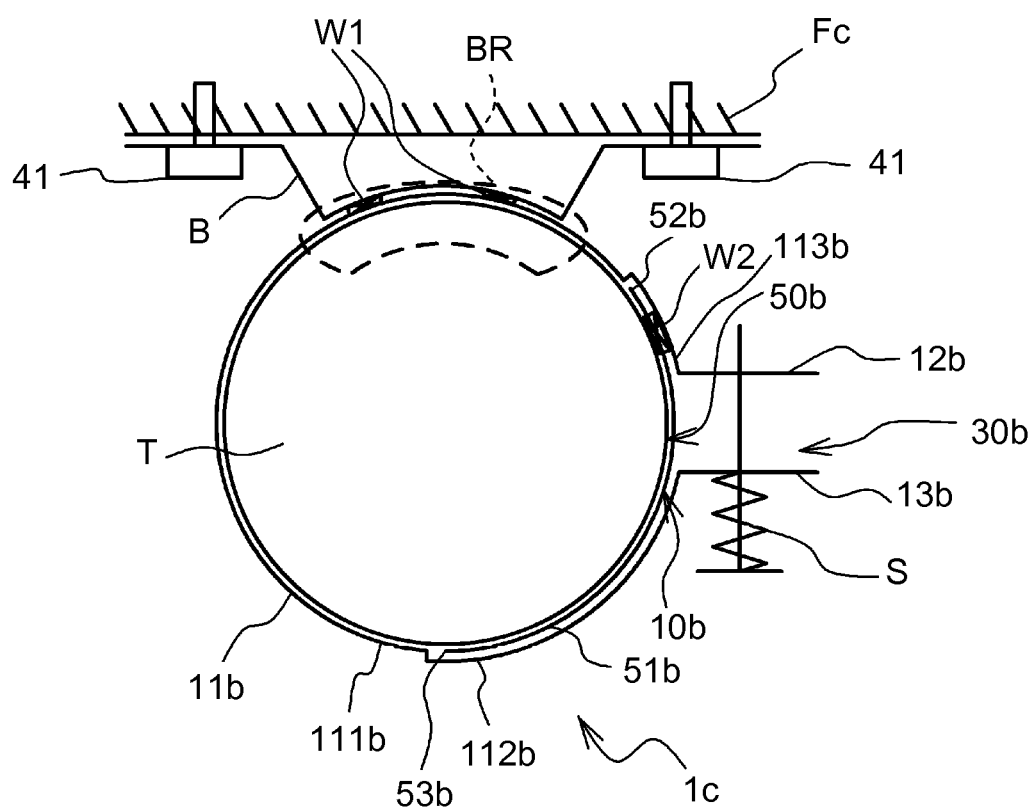
FIG. 6 is a schematic cross-sectional view of a fixing apparatus of a fourth embodiment.

FIG. 6 is a schematic cross-sectional view of a fixing apparatus 1c of a fourth embodiment. Note that the same components as those of the third embodiment are assigned the same reference numerals, and an overlapping description is omitted. FIG. 6 corresponds to FIG. 2. The fixing apparatus 1c includes two sets of the bands 10b, 50b, and the urging mechanism 30b. The bracket B is fixed to a lower surface of a platform Fc by the bolts 41. The tank T is supported on the arc-shaped portion of the bracket B via the band 10b, and the bracket B is supported on the platform Fc.

The platform Fc and the bracket B are examples of the support member that supports the tank T. The weight of the tank T is always partly applied to the bands 10b, 50b. The platform Fc supports the tank T between the platform Fc and the bands 10b, 50b. In such a case, when a downward force for separating the tank T from the bracket B is applied, the bands 10b, 50b attempt to swing in directions opposite to each other. Accordingly, the rotation of the tank T is suppressed, and the rattling of the tank T is suppressed.

Although the embodiments of the invention have been described above in detail, the invention is not limited to the particular embodiments, and various alternatives and modifications may be made without departing from the scope of the invention described in the claims.

The tank is not limited to the resin, and, for example, may be made of metal. The tank is not limited to the cylindrical shape, and may have a prismatic shape, a spherical shape, or other shapes. The tank is not limited to store the hydrogen gas, and, for example, may store a fuel gas such as an LP gas, a liquid fuel, and a gas or a liquid other than the fuel. The number of the bands arranged in the longitudinal direction of the tank may be three or more. The tank fixing apparatus is not limited to be used for the tank mounted in the vehicle. The tank fixing apparatus can be used for a tank mounted in a moving body other than the vehicle, and can be also used for an indoor or outdoor stationary tank. This is because the stationary tank may receive vibration from, for example, a ground. Although the urging mechanisms 30 are arranged on the same side with respect to the tank T in the first embodiment, the urging mechanisms 30 may be arranged opposite to each other across the tank T, and the fixing mechanisms 20 may be also arranged opposite to each other. In the first embodiment, the band 50 is fixed to the platform F by the bolt 31 of the urging mechanism 30. However, the band 50 may be fixed to the platform F by means different from the bolt 31. In this case, the band 50 may be fixed to the platform F by welding or by using a bolt and a nut.

What is claimed is:

1. A tank fixing apparatus comprising:
   a first band including a first fixed portion that is fixed to a support member that supports a tank, a first pressing portion that extends from the first fixed portion and presses an outer periphery of the tank toward the support member, and a first distal end portion that extends from the first pressing portion and is not fixed to the support member;
   an urging portion that gives a pressing force for the tank to the first band;
   a first fixing portion that fixes the first fixed portion of the first band to the support member;
   a second band including a second fixed portion that is fixed to the support member or the first band, a second pressing portion that extends from the second fixed portion and presses the tank, and a second distal end portion that extends from the second pressing portion and is not fixed to the support member; and
   a second fixing portion that fixes the second fixed portion to the support member or the first band,
   wherein the second pressing portion of the second band extends between one portion of the first pressing portion and the tank, and presses the tank by an elastic force of the second pressing portion itself, and
   a direction of the first band extending from the first fixed portion to the first distal end portion is opposite to a direction of the second band extending from the second fixed portion to the second distal end portion.

2. The tank fixing apparatus according to claim 1, wherein the first pressing portion includes a direct pressing portion that is located on the first fixed portion-side and presses the tank without the second pressing portion interposed between the direct pressing portion and the tank, and an indirect pressing portion that is located on the first distal end portion -side and presses the tank with the second pressing portion interposed between the indirect pressing portion and the tank.

3. The tank fixing apparatus according to claim 1, wherein the urging portion includes an elastic body that gives a pressing force to the first band by urging the first distal end portion, and a support shaft that holds the elastic body and is fixed to the support member while passing through the first distal end portion so as to enable the first distal end portion to slide on the support shaft, the second fixing portion is the support shaft, and the second fixed portion is fixed to the support member by the support shaft.

4. The tank fixing apparatus according to claim 1, wherein the first and second fixed portions, and the first and second pressing portions are wound around the outer periphery of the tank, and the second fixed portion is fixed to the first band.

* * * * *